United States Patent
O'Hara et al.

(10) Patent No.: US 10,922,845 B2
(45) Date of Patent: Feb. 16, 2021

(54) APPARATUS AND METHOD FOR EFFICIENTLY TRAINING FEATURE DETECTORS

(71) Applicant: HERE GLOBAL B.V., Eindhoven (NL)

(72) Inventors: Stephen O'Hara, Eindhoven (NL); Nicholas Dronen, Eindhoven (NL); Jan Van Sickle, Eindhoven (NL); Brad Keserich, Eindhoven (NL)

(73) Assignee: HERE GLOBAL B.V., Eindhoven (NL)

( * ) Notice: Subject to any disclaimer, the term of this patent is extended or adjusted under 35 U.S.C. 154(b) by 132 days.

(21) Appl. No.: 16/229,777

(22) Filed: Dec. 21, 2018

(65) Prior Publication Data

US 2020/0202573 A1 Jun. 25, 2020

(51) Int. Cl.
*G06K 9/00* (2006.01)
*G06T 7/90* (2017.01)

(52) U.S. Cl.
CPC ...... *G06T 7/90* (2017.01); *G06T 2207/10024* (2013.01); *G06T 2207/10036* (2013.01);
(Continued)

(58) Field of Classification Search
CPC .... G06T 7/90; G06T 7/74; G06T 7/73; G06T 7/60; G06T 2207/30252; G06T 2207/20081; G06T 2207/10024; G06T 2207/10036; G06T 2207/10032; G06T 2207/30184; G06T 2207/20084;
(Continued)

(56) References Cited

U.S. PATENT DOCUMENTS 8,515,982 B1 8/2013 Hickman et al.
9,230,168 B2 1/2016 Gueguen
(Continued)

FOREIGN PATENT DOCUMENTS

WO WO 2017/182225 A1 10/2017

OTHER PUBLICATIONS

Cavigelli, L. et al., *Computationally Efficient Target Classifiation in Multispectral Image data With Deep Neural Networks*, Proceedings vol. 9997, Target and Background Signatures II, SPIE Security + Defence, Edinburgh, UK (2016) 12 pages.
(Continued)

*Primary Examiner* — Jose L Couso
(74) *Attorney, Agent, or Firm* — Alston & Bird LLP

(57) ABSTRACT

An apparatus, method and computer program product are provided to train a feature detector to identify a respective feature from images captured by a camera. With respect to an apparatus, the apparatus causes at least one feature from one or more images that have been labelled to be projected onto a map. The apparatus is also caused to refine a representation of a path of a vehicle that carries a camera that captured the one or more images based upon registration of the at least one feature that has been projected with the map. Based upon the path of the vehicle following refinement, the apparatus projects one or more other features that have not been labelled from the map into the one or more images and then utilizes the images to train a feature detector.

20 Claims, 7 Drawing Sheets

(52) U.S. Cl.
CPC ............... *G06T 2207/20081* (2013.01); *G06T 2207/30252* (2013.01)

(58) Field of Classification Search
CPC ........... G06T 2207/30261; G06T 2207/10048; G06K 9/00791; G06K 9/00798; G06K 9/00771; G06K 9/00805; G06K 9/00818; G06K 9/0062; G06K 9/0063; G06K 9/00664; G06K 9/00651; G06K 9/00671; G06K 9/00637; G06K 9/6202; G06K 9/6223; G06K 9/6267; G06K 9/6218; G06K 9/6219; G06K 9/623; G06K 9/6228; G06K 9/6256; G06K 9/6259; G06K 9/6292; G06K 9/627; G06K 9/46; G06K 9/4604; G06K 9/4609; G06K 9/4628; G06K 9/4671; G06K 9/468; G06K 9/3233; G06K 2009/4666; G06K 2009/00738; G06K 2009/6295; H04N 5/332; H04N 7/183; B60W 2420/42; B60W 2556/50; B60W 40/072; B60W 40/076; B60R 21/01538; B60R 25/305; G01C 21/3602; G01C 21/32; G05D 1/0246; G05D 2201/0213; G06N 3/04; G06N 3/0454; G06N 3/0445; G06N 3/08; G06N 3/084; G06N 3/088; G06N 7/005; G06N 20/00; G06N 20/20; G08G 1/163; G08G 1/164; G08G 1/165; G08G 1/166; G08G 1/167; G06F 16/29

See application file for complete search history.

(56) References Cited

U.S. PATENT DOCUMENTS

| | | | |
|---|---|---|---|
| 9,665,802 B2 | 5/2017 | Wang et al. | |
| 10,203,210 B1* | 2/2019 | Tagawa | G01C 21/32 |
| 10,303,980 B1* | 5/2019 | Kim | G06K 9/6232 |
| 2014/0347475 A1* | 11/2014 | Divakaran | G06K 9/00771 |
| | | | 348/135 |
| 2017/0031934 A1* | 2/2017 | Snoek | G06F 16/13 |
| 2017/0076438 A1 | 3/2017 | Kottenstette et al. | |
| 2017/0124394 A1* | 5/2017 | Thavalengal | G06T 5/00 |
| 2017/0287170 A1 | 10/2017 | Perona et al. | |
| 2018/0012082 A1 | 1/2018 | Satazoda et al. | |
| 2018/0137355 A1* | 5/2018 | Rostand | G06N 3/08 |
| 2018/0144496 A1* | 5/2018 | Posner | G06T 7/73 |
| 2018/0150726 A1* | 5/2018 | Gorban | G06K 9/6269 |
| 2018/0283892 A1* | 10/2018 | Behrendt | G06K 9/6271 |
| 2018/0299841 A1* | 10/2018 | Appu | G05B 13/027 |
| 2018/0308260 A1* | 10/2018 | Robles-Kelly | G06T 1/0007 |
| 2018/0365820 A1* | 12/2018 | Nipe | G06K 9/00664 |
| 2018/0365888 A1* | 12/2018 | Satazoda | G06N 3/0454 |
| 2019/0095716 A1* | 3/2019 | Shrestha | G08B 21/187 |
| 2019/0220997 A1* | 7/2019 | Asai | G06F 16/29 |
| 2020/0094784 A1* | 3/2020 | Herman | G02B 27/0006 |

OTHER PUBLICATIONS

Karasawa, T. et al., *Multispectral Object Direction for Autonomous Vehicles*, Thematic Workshops '17, Session 1, Mountain View, CA (Oct. 23-27, 2017) 35-43.

Mitash, C. et al., *A Self-Supervised Learning System for Object Detection Using Physics Simulation and Multi-View Pose Estimation* [online] [retrieved Jan. 15, 2019]. Retrieved from the Internet: <URL: https://arxiv.org/pdf/1703-03347.pdf>. (dated Aug. 3, 2017) 7 pages.

Reza, Md. A. et al., *Label Propagation in RGB-D Video*, 2017 IEEE/RSJ International Conference on Intelligent Robots and Systems (IROS) (Sep. 24-28, 2017) 6 pages.

Settles, B., *Active Learning Literature Survey*, Computer Sciences Technical Report 1648, University of Wisconsin-Madison (dated Jan. 26, 2010) 65 pages.

Sivaraman, S. et al., *A General Active-Learning Framework for On-Road Vehicle Recognition and Tracking*, IEEE Transactions on Intelligent Transportation Systems, vol. 11, No. 2 (Jun. 2010) 267-276.

Tuia, D. et al., *A Survey of a Active Learning Algorithms for Supervised Remote Sensing Image Classification*, IEEE Journal of Selected topics in Signal Processing (Sep. 11, 2013), 29 pages.

* cited by examiner

APPARATUS AND METHOD FOR EFFICIENTLY TRAINING FEATURE DETECTORS

TECHNOLOGICAL FIELD

An example embodiment relates generally to feature detectors for facilitating computer vision and, more particularly, to an apparatus, method and computer program product for efficiently training feature detectors.

BACKGROUND

Computer vision models rely upon feature detectors, each of which is trained to identify a particular type of feature from one or more images. While computer vision models and feature detectors are utilized in a variety of different applications, the development of automated vehicle technology, such as employed by autonomous or semi-autonomous vehicles, has increased the demand for computer vision models and corresponding feature detectors for detecting various features from images of the environment, such as lane markings, signs or the like.

Prior to being utilized to detect a particular feature in an image, a feature detector must be trained to reliably detect the feature from images captured by a camera. In this regard, the camera is mounted on or otherwise installed in a vehicle and the vehicle is driven, typically many miles, through diverse environments. The camera captures images while the vehicle is driven and features that appear within the images are labelled by humans. The feature detector for each feature is then trained based upon the manually labelled images so as to consistently detect the respective feature from the images captured by the camera. Thereafter, the trained feature detector can be utilized to detect the same feature from images captured by a camera carried by an autonomous vehicle in order to ensure that the driving of the autonomous vehicle is accomplished in a reliable manner.

The accuracy of a trained feature detector is dependent upon the camera that captures the images to be analyzed. Sometimes, however, the camera that captures the images to be reviewed by a feature detector is changed, such as to a different type of camera. The introduction of a different camera for capturing the images may occur for various reasons. For example, a new model of an autonomous vehicle may be introduced which includes any number of new components includes one or more different cameras from those utilized by prior models of autonomous vehicles. Or, a mapping services provider may elect to introduce a different camera, such as camera that offers improved performance, on the capture vehicles that drive around portions of the road network and capture images that are subsequently analysed and utilized to improve the maps offered by the mapping services provider.

In an instance in which the images are captured by a different camera than the camera that captured the images with which the feature detector was trained, the feature detector may no longer perform with the desired accuracy. As such, the feature detector must again be trained utilizing images captured by the different camera in order to improve the accuracy of feature detection. Since many computer vision models including those utilized by autonomous vehicles include a plurality of feature detectors with each feature detector trained to identify a different respective feature, the introduction of a different camera to capture images results in the training of all of the plurality of feature detectors in order to reliably detect the respective features in the images captured by the different camera. This training of the plurality of feature detectors in order to accommodate the use of a different camera adds significant time and cost to the development and use of a computer vision model.

BRIEF SUMMARY

An apparatus, method and computer program product are provided in accordance with an example embodiment in order to efficiently train a feature detector to identify a respective feature from images captured by a camera. In this regard, the apparatus, method and computer program product of an example embodiment are configured to bootstrap the training of feature detectors such that the training of the feature detectors is performed more efficiently. As such, the training of feature detectors that occurs upon the introduction of a different camera for capturing images of the environment, such as utilized to detect features in conjunction with automated driving technology, may be performed more efficiently, thereby reducing the time and cost associated with the training of the feature detectors and correspondingly reducing the barriers to entry for the introduction of different camera technology for autonomous driving and other camera vision applications.

In an example embodiment, an apparatus is provided that includes at least one processor and at least one non-transitory memory including computer program code instructions with the computer program code instructions configured to, when executed, cause the apparatus to cause at least one feature from one or more images that have been labelled to be projected onto a map. The apparatus is also caused to refine a representation of a path of a vehicle that carries a camera that captured the one or more images based upon registration of the at least one feature that has been projected with the map. Based upon the representation of the path of the vehicle following refinement, the apparatus is caused to project one or more other features that have not been labelled from the map into the one or more images. The apparatus is also caused to train a feature detector to identify at least one of the one or more other features based upon projection of the one or more other features from the map into the one or more other images.

The computer program code instructions configured to, when executed, cause the apparatus to cause the at least one feature to be projected onto the map include computer program code instructions configured to, when executed, cause the apparatus of an example embodiment to cause the at least one feature to be projected onto the map based upon a location at which the one or more images were captured. The computer program code instructions configured to, when executed, cause the apparatus to refine the representation of the path of the vehicle include computer program code instructions configured to, when executed, cause the apparatus of an example embodiment to refine the representation of the path of the vehicle based upon the registration of the at least one feature from the one or more images that have been labelled to a corresponding feature represented by the map. In this example embodiment, the computer program code instructions configured to, when executed, cause the apparatus to refine the representation of the path of the vehicle include computer program code instructions configured to, when executed, cause the apparatus to modify a location of the vehicle upon capture of the one or more images based upon a difference between a location of the at least one feature as defined by the one or more images and a location of the corresponding feature represented by the map.

The computer program code instructions configured to, when executed, cause the apparatus to project one or more other features include computer program code instructions configured to, when executed, cause the apparatus of an example embodiment to project the one or more other features from the map into the one or more images based upon a location at which the one or more images were captured as modified based upon refinement of the representation of the path of the vehicle. The computer program code instructions configured to, when executed, cause the apparatus to project one or more other features include computer program code instructions configured to, when executed, cause the apparatus of an example embodiment to exclude projection of a feature from the map into an image in an instance in which the projection of the feature overlaps with a dynamic object within the image. The computer program code instructions configured to, when executed, cause the apparatus to train the feature detector include computer program code instructions configured to, when executed, cause the apparatus of an example embodiment to train each of a plurality of feature detectors. Each feature detector is configured to identify a different respective feature. The computer program code instructions are further configured to, when executed, cause the apparatus of an example embodiment to receive images captured by a camera carried by a vehicle while in transit. In an example embodiment, the map includes a map configured to support autonomous driving.

In another example embodiment, a method is provided that includes causing at least one feature from one or more images that have been labelled to be projected onto a map and refining a representation of a path of a vehicle that carries a camera that captured the one or more images based upon registration of the at least one feature that has been projected with the map. Based upon the representation of the path of the vehicle following refinement, the method projects one or more other features that have not been labelled from the map into the one or more images. The method also includes training a feature detector to identify at least one of the one or more other features based upon projection of the one or more other features from the map into the one or more other images.

The method of an example embodiment causes the at least one feature to be projected onto the map based upon a location at which the one or more images were captured. In an example embodiment, the method refines the representation of the path of the vehicle based upon the registration of the at least one feature from the one or more images that have been labelled to a corresponding feature represented by the map. In this example embodiment, the method refines the representation of the path of the vehicle by modifying a location of the vehicle upon capture of the one or more images based upon a difference between a location of the at least one feature as defined by the one or more images and a location of the corresponding feature represented by the map.

The method of an example embodiment projects one or more other features from the map into the one or more images based upon a location at which the one or more images were captured as modified based upon refinement of the representation of the path of the vehicle. In relation to projecting one or more features, the method of an example embodiment, the method excludes projection of a feature from the map into an image in an instance in which the projection of the feature overlaps with a dynamic object within the image. The method of an example embodiment trains the feature detector by training each of a plurality of feature detectors. Each feature detector is configured to identify a different respective feature. The method of an example embodiment also includes receiving images captured by a camera carried by a vehicle while in transit. In an example embodiment, the map includes a map configured to support autonomous driving.

In a further example embodiment, a computer program product is provided that includes at least one non-transitory computer-readable storage medium having computer-executable program code instructions stored therein with the computer-executable program code instructions including program code instructions configured, upon execution, to cause at least one feature from one or more images that have been labelled to be projected onto a map. The computer-executable program code instructions also include program code instructions configured, upon execution, to refine a representation of a path of a vehicle that carries a camera that captured the one or more images based upon registration of the at least one feature that has been projected with the map. Based upon the representation of the path of the vehicle following refinement, the computer-executable program code instructions include program code instructions configured, upon execution, to project one or more other features that have not been labelled from the map into the one or more images. The computer-executable program code instructions further include program code instructions configured, upon execution, to train a feature detector to identify at least one of the one or more other features based upon projection of the one or more other features from the map into the one or more other images.

The program code instructions configured to cause the at least one feature to be projected onto the map include program code instructions configured to cause the at least one feature to be projected onto the map based upon a location at which the one or more images were captured. The program code instructions configured to refine the representation of the path of the vehicle include program code instructions configured to refine the representation of the path of the vehicle based upon the registration of the at least one feature from the one or more images that have been labelled to a corresponding feature represented by the map. In this example embodiment, the program code instructions configured to refine the representation of the path of the vehicle include program code instructions configured to modify a location of the vehicle upon capture of the one or more images based upon a difference between a location of the at least one feature as defined by the one or more images and a location of the corresponding feature represented by the map.

The program code instructions configured to project one or more other features include program code instructions configured to project the one or more other features from the map into the one or more images based upon a location at which the one or more images were captured as modified based upon refinement of the representation of the path of the vehicle. The program code instructions configured to project one or more other features include program code instructions configured to exclude projection of a feature from the map into an image in an instance in which the projection of the feature overlaps with a dynamic object within the image. The program code instructions configured to train the feature detector include program code instructions configured to train each of a plurality of feature detectors. Each feature detector is configured to identify a different respective feature. The computer-executable program code instructions further include program code instructions configured, upon execution, to receive images captured by a camera carried by a vehicle while in transit. In an example embodiment, the map includes a map configured to support autonomous driving.

In yet another example embodiment, an apparatus is provided that includes means for causing at least one feature from one or more images that have been labelled to be projected onto a map and means for refining a representation of a path of a vehicle that carries a camera that captured the one or more images based upon registration of the at least one feature that has been projected with the map. Based upon the representation of the path of the vehicle following refinement, the apparatus includes means for projecting one or more other features that have not been labelled from the map into the one or more images. The apparatus also includes means for training a feature detector to identify at least one of the one or more other features based upon projection of the one or more other features from the map into the one or more other images.

The means for causing the at least one feature to be projected onto the map includes, in an example embodiment, means for causing the at least one feature to be projected onto the map based upon a location at which the one or more images were captured. In an example embodiment, the means for refining the representation of the path of the vehicle includes means for refining the representation of the path of the vehicle based upon the registration of the at least one feature from the one or more images that have been labelled to a corresponding feature represented by the map. In this example embodiment, the means for refining the representation of the path of the vehicle includes means for modifying a location of the vehicle upon capture of the one or more images based upon a difference between a location of the at least one feature as defined by the one or more images and a location of the corresponding feature represented by the map.

In an example embodiment, the means for projecting one or more other features includes means for projecting the one or more other features from the map into the one or more images based upon a location at which the one or more images were captured as modified based upon refinement of the representation of the path of the vehicle. The means for projecting one or more other features include, in one embodiment, means for excluding projection of a feature from the map into an image in an instance in which the projection of the feature overlaps with a dynamic object within the image. In an example embodiment, the means for training the feature detector includes means for training each of a plurality of feature detectors. Each feature detector is configured to identify a different respective feature. The apparatus of an example embodiment further includes means for receiving images captured by a camera carried by a vehicle while in transit. In an example embodiment, the map includes a map configured to support autonomous driving.

In an example embodiment, an apparatus is provided that includes at least one processor and at least one non-transitory memory including computer program code instructions with the computer program code instructions configured to, when executed, cause the apparatus to train a hyperspectral feature detector to identify at least one of a plurality of features based upon the at least one feature in one or more hyperspectral images that has been labelled. The apparatus is also caused to automatically label, with the hyperspectral feature detector, the at least one feature in a red green blue (RGB) image and to train an RGB feature detector to identify the at least one feature based upon the RGB image in which the at least one feature has been automatically labelled by the hyperspectral feature detector.

The computer program code instructions are further configured to, when executed, cause the apparatus of an example embodiment to receive a plurality of hyperspectral images and a plurality of RGB images captured by a hyperspectral camera and an RGB camera, respectively, wherein the hyperspectral camera and the RGB camera are each carried by a vehicle while in transit. The computer program code instructions configured to, when executed, cause the apparatus to train the hyperspectral feature detector include computer program code instructions configured to, when executed, cause the apparatus of an example embodiment to train each of a plurality of hyperspectral feature detectors, each hyperspectral feature detector configured to identify a different respective feature. In this example embodiment, the computer program code instructions configured to, when executed, cause the apparatus to train the RGB feature detector include computer program code instructions configured to, when executed, cause the apparatus to train each of a plurality of RGB feature detectors. Each RGB feature detector is configured to identify a different respective feature based upon the RGB image in which the respective feature has been automatically labelled by different one of the plurality of hyperspectral feature detectors. In an example embodiment, the one or more hyperspectral images that are labelled are a subset of the hyperspectral images that are captured.

In another example embodiment, a method is provided that includes training a hyperspectral feature detector to identify at least one of a plurality of features based upon the at least one feature in one or more hyperspectral images that has been labelled. The method also includes automatically labelling, with the hyperspectral feature detector, the at least one feature in a red green blue (RGB) image and training an RGB feature detector to identify the at least one feature based upon the RGB image in which the at least one feature has been automatically labelled by the hyperspectral feature detector.

The method further includes receiving a plurality of hyperspectral images and a plurality of RGB images captured by a hyperspectral camera and an RGB camera, respectively. The hyperspectral camera and the RGB camera are each carried by a vehicle while in transit. The method of an example embodiment trains the hyperspectral feature detector by training each of a plurality of hyperspectral feature detectors. Each hyperspectral feature detector is configured to identify a different respective feature. In this example embodiment, the method trains the RGB feature detector by training each of a plurality of RGB feature detectors. Each RGB feature detector is configured to identify a different respective feature based upon the RGB image in which the respective feature has been automatically labelled by different one of the plurality of hyperspectral feature detectors. In an example embodiment, the one or more hyperspectral images that are labelled are a subset of the hyperspectral images that are captured.

In a further example embodiment, a computer program product is provided that includes at least one non-transitory computer-readable storage medium having computer-executable program code instructions stored therein with the computer-executable program code instructions including program code instructions configured, upon execution, to train a hyperspectral feature detector to identify at least one of a plurality of features based upon the at least one feature in one or more hyperspectral images that has been labelled. The computer-executable program code instructions also include program code instructions configured, upon execution, to automatically label, with the hyperspectral feature detector, the at least one feature in a red green blue (RGB) image and program code instructions configured, upon execution, to train an RGB feature detector to identify the at least one feature based upon the RGB image in which the at least one feature has been automatically labelled by the hyperspectral feature detector.

The computer-executable program code instructions of an example embodiment include program code instructions configured, upon execution, to receive a plurality of hyperspectral images and a plurality of RGB images captured by a hyperspectral camera and an RGB camera, respectively. The hyperspectral camera and the RGB camera are each carried by a vehicle while in transit. The program code instructions configured to train the hyperspectral feature detector include program code instructions configured to train each of a plurality of hyperspectral feature detectors. Each hyperspectral feature detector is configured to identify a different respective feature. In this example embodiment, the program code instructions configured to train the RGB feature detector include program code instructions configured to train each of a plurality of RGB feature detectors. Each RGB feature detector is configured to identify a different respective feature based upon the RGB image in which the respective feature has been automatically labelled by different one of the plurality of hyperspectral feature detectors. In an example embodiment, the one or more hyperspectral images that are labelled are a subset of the hyperspectral images that are captured.

In yet another example embodiment, an apparatus is provided that includes means for training a hyperspectral feature detector to identify at least one of a plurality of features based upon the at least one feature in one or more hyperspectral images that has been labelled. The apparatus also includes means for automatically labelling, with the hyperspectral feature detector, the at least one feature in a red green blue (RGB) image and training an RGB feature detector to identify the at least one feature based upon the RGB image in which the at least one feature has been automatically labelled by the hyperspectral feature detector.

The apparatus of an example embodiment also includes means for receiving a plurality of hyperspectral images and a plurality of RGB images captured by a hyperspectral camera and an RGB camera. The hyperspectral camera and the RGB camera are each carried by a vehicle while in transit. The means for training the hyperspectral feature detector includes, in one embodiment means for training each of a plurality of hyperspectral feature detectors. Each hyperspectral feature detector is configured to identify a different respective feature. In this example embodiment, the means for training the RGB feature detector includes means for training each of a plurality of RGB feature detectors. Each RGB feature detector is configured to identify a different respective feature based upon the RGB image in which the respective feature has been automatically labelled by different one of the plurality of hyperspectral feature detectors. In an example embodiment, the one or more hyperspectral images that are labelled are a subset of the hyperspectral images that are captured.

In an example embodiment, an apparatus is provided that includes at least one processor and at least one non-transitory memory including computer program code instructions with the computer program code instructions configured to, when executed, cause the apparatus to generate an image mask of at least one feature from one or more hyperspectral images. The apparatus is also caused to project the image mask onto a corresponding red green blue (RGB) image and to train an RGB feature detector to identify the at least one feature based upon the RGB image onto which the image mask of the at least one feature has been projected.

The computer program code instructions configured to, when executed, cause the apparatus to generate the image mask include computer program code instructions configured to, when executed, cause the apparatus of an example embodiment to generate the image mask based on one or more unique spectral characteristics of the at least one feature. The computer program code instructions configured to, when executed, cause the apparatus to project the image mask onto the corresponding RGB image include computer program code instructions configured to, when executed, cause the apparatus of an example embodiment to project the image mask onto the corresponding RGB image captured at a common location as the hyperspectral image from which the image mask is generated. The computer program code instructions configured to, when executed, cause the apparatus to project the image mask onto the corresponding RGB image include computer program code instructions configured to, when executed, cause the apparatus of an example embodiment to label the at least one feature in the corresponding RGB image based upon projection of the image mask onto the corresponding RGB image.

The computer program code instructions configured to, when executed, cause the apparatus to train the RGB feature detector include computer program code instructions configured to, when executed, cause the apparatus of an example embodiment to train each of a plurality of RGB feature detectors. Each RGB feature detector is configured to identify a different respective feature based upon projection of a different image mask onto a corresponding RGB image. Each image mask is generated for a different feature of a plurality of features. The computer program code instructions are further configured to, when executed, cause the apparatus of an example embodiment to receive a plurality of hyperspectral images and a plurality of RGB images captured by a hyperspectral camera and an RGB camera, respectively. The hyperspectral camera and the RGB camera are each carried by a vehicle while in transit.

In another example embodiment, a method is provided that includes an image mask of at least one feature from one or more hyperspectral images. The method also includes projecting the image mask onto a corresponding red green blue (RGB) image and training an RGB feature detector to identify the at least one feature based upon the RGB image onto which the image mask of the at least one feature has been projected.

The method of an example embodiment generates the image mask by generating the image mask based on one or more unique spectral characteristics of the at least one feature. In an example embodiment, the method projects the image mask onto the corresponding RGB image by projecting the image mask onto the corresponding RGB image captured at a common location as the hyperspectral image from which the image mask is generated. The method of an example embodiment projects the image mask onto the corresponding RGB image by labelling the at least one feature in the corresponding RGB image based upon projection of the image mask onto the corresponding RGB image.

In an example embodiment, the method trains the RGB feature detector by training each of a plurality of RGB feature detectors. Each RGB feature detector is configured to identify a different respective feature based upon projection of a different image mask onto a corresponding RGB image. Each image mask is generated for a different feature of a plurality of features. The method of an example embodiment further includes receiving a plurality of hyperspectral images and a plurality of RGB images captured by a hyperspectral camera and an RGB camera, respectively. The hyperspectral camera and the RGB camera are each carried by a vehicle while in transit.

In a further example embodiment, a computer program product is provided that includes at least one non-transitory computer-readable storage medium having computer-executable program code instructions stored therein with the computer-executable program code instructions including program code instructions configured, upon execution, to generate an image mask of at least one feature from one or more hyperspectral images. The computer-executable program code instructions also include program code instructions configured, upon execution, to project the image mask onto a corresponding red green blue (RGB) image and program code instructions to train an RGB feature detector to identify the at least one feature based upon the RGB image onto which the image mask of the at least one feature has been projected.

The program code instructions of an example embodiment that are configured to generate the image mask include program code instructions configured to generate the image mask based on one or more unique spectral characteristics of the at least one feature. In an example embodiment, the program code instructions configured to project the image mask onto the corresponding RGB image include program code instructions configured to project the image mask onto the corresponding RGB image captured at a common location as the hyperspectral image from which the image mask is generated. The program code instructions configured to project the image mask onto the corresponding RGB image in accordance with an example embodiment include program code instructions configured to label the at least one feature in the corresponding RGB image based upon projection of the image mask onto the corresponding RGB image.

The program code instructions of an example embodiment that are configured to train the RGB feature detector include program code instructions configured to train each of a plurality of RGB feature detectors. Each RGB feature detector is configured to identify a different respective feature based upon projection of a different image mask onto a corresponding RGB image. Each image mask is generated for a different feature of a plurality of features. The computer-executable program code instructions of an example embodiment also include program code instructions configured, upon execution, to receive a plurality of hyperspectral images and a plurality of RGB images captured by a hyperspectral camera and an RGB camera, respectively. The hyperspectral camera and the RGB camera are each carried by a vehicle while in transit.

In yet another example embodiment, an apparatus is provided that includes means for generating an image mask of at least one feature from one or more hyperspectral images. The apparatus also includes means for projecting the image mask onto a corresponding red green blue (RGB) image and means for training an RGB feature detector to identify the at least one feature based upon the RGB image onto which the image mask of the at least one feature has been projected.

In an example embodiment, the means for generating the image mask includes means for generating the image mask based on one or more unique spectral characteristics of the at least one feature. The means for projecting the image mask onto the corresponding RGB image includes, in an example embodiment, means for projecting the image mask onto the corresponding RGB image captured at a common location as the hyperspectral image from which the image mask is generated. In an example embodiment, the means for projecting the image mask onto the corresponding RGB image includes means for labelling the at least one feature in the corresponding RGB image based upon projection of the image mask onto the corresponding RGB image.

The means for training the RGB feature detector include, in one embodiment, means for training each of a plurality of RGB feature detectors. Each RGB feature detector is configured to identify a different respective feature based upon projection of a different image mask onto a corresponding RGB image. Each image mask is generated for a different feature of a plurality of features. The apparatus of an example embodiment further includes means for receiving a plurality of hyperspectral images and a plurality of RGB images captured by a hyperspectral camera and an RGB camera, respectively. The hyperspectral camera and the RGB camera are each carried by a vehicle while in transit.

The above summary is provided merely for purposes of summarizing some example embodiments to provide a basic understanding of some aspects of the invention. Accordingly, it will be appreciated that the above-described embodiments are merely examples and should not be construed to narrow the scope or spirit of the invention in any way. It will be appreciated that the scope of the invention encompasses many potential embodiments in addition to those here summarized, some of which will be further described below.

BRIEF DESCRIPTION OF THE DRAWINGS

Figure 1:
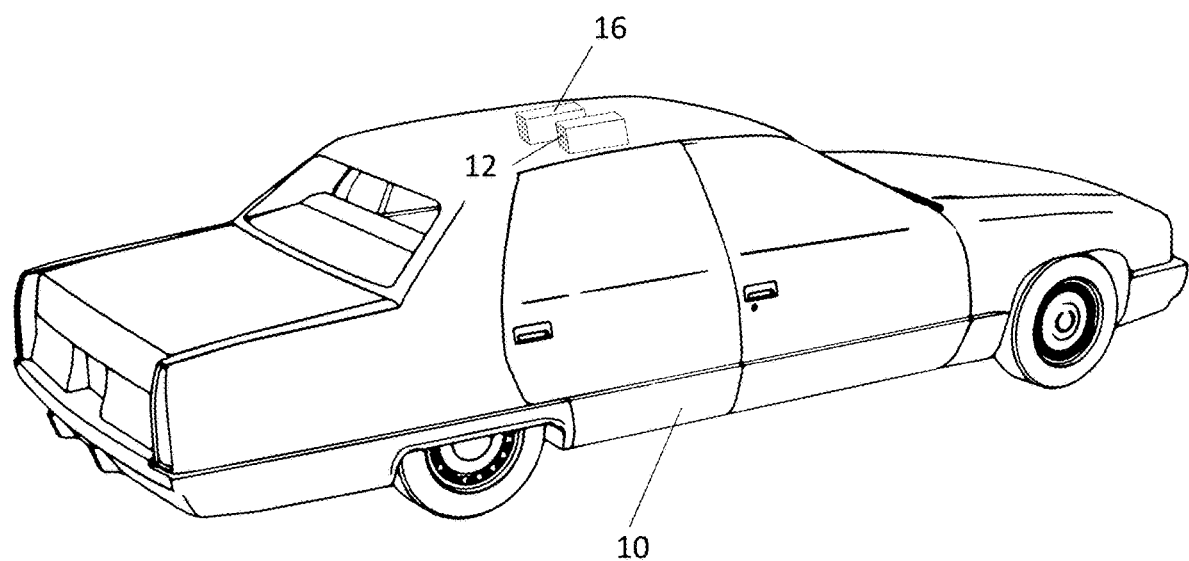
Figure 2:
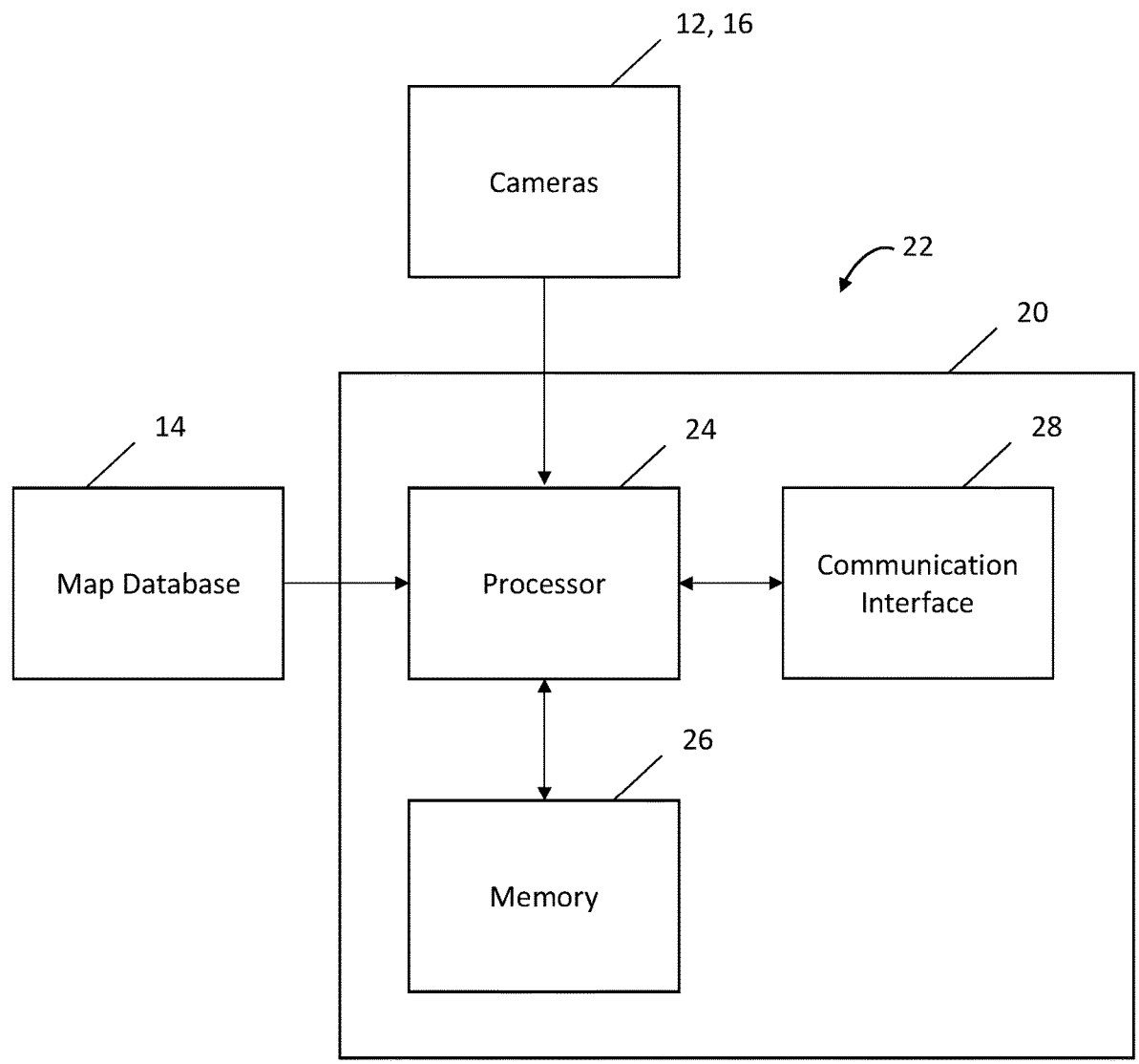
Figure 3:
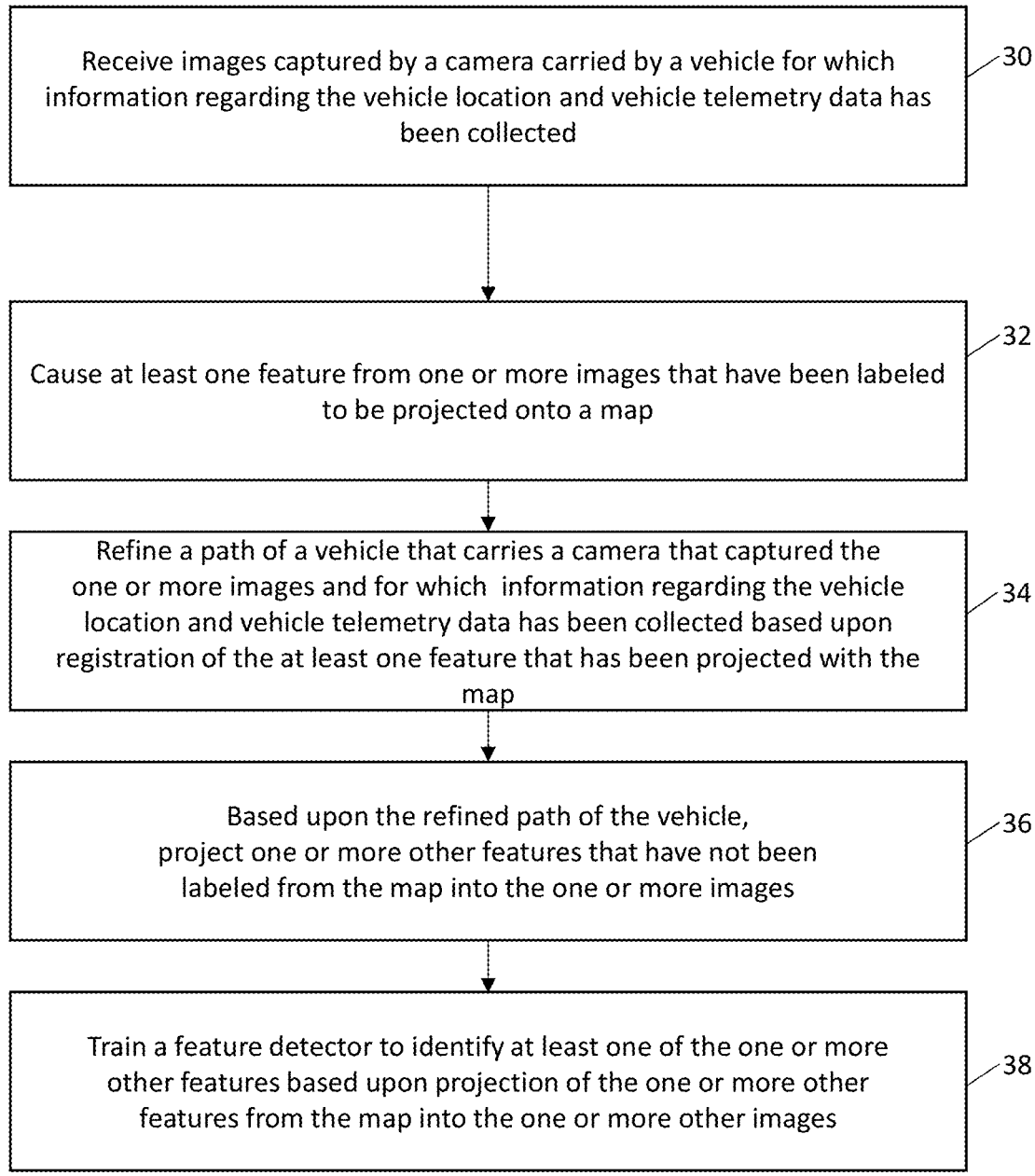
Figure 4:
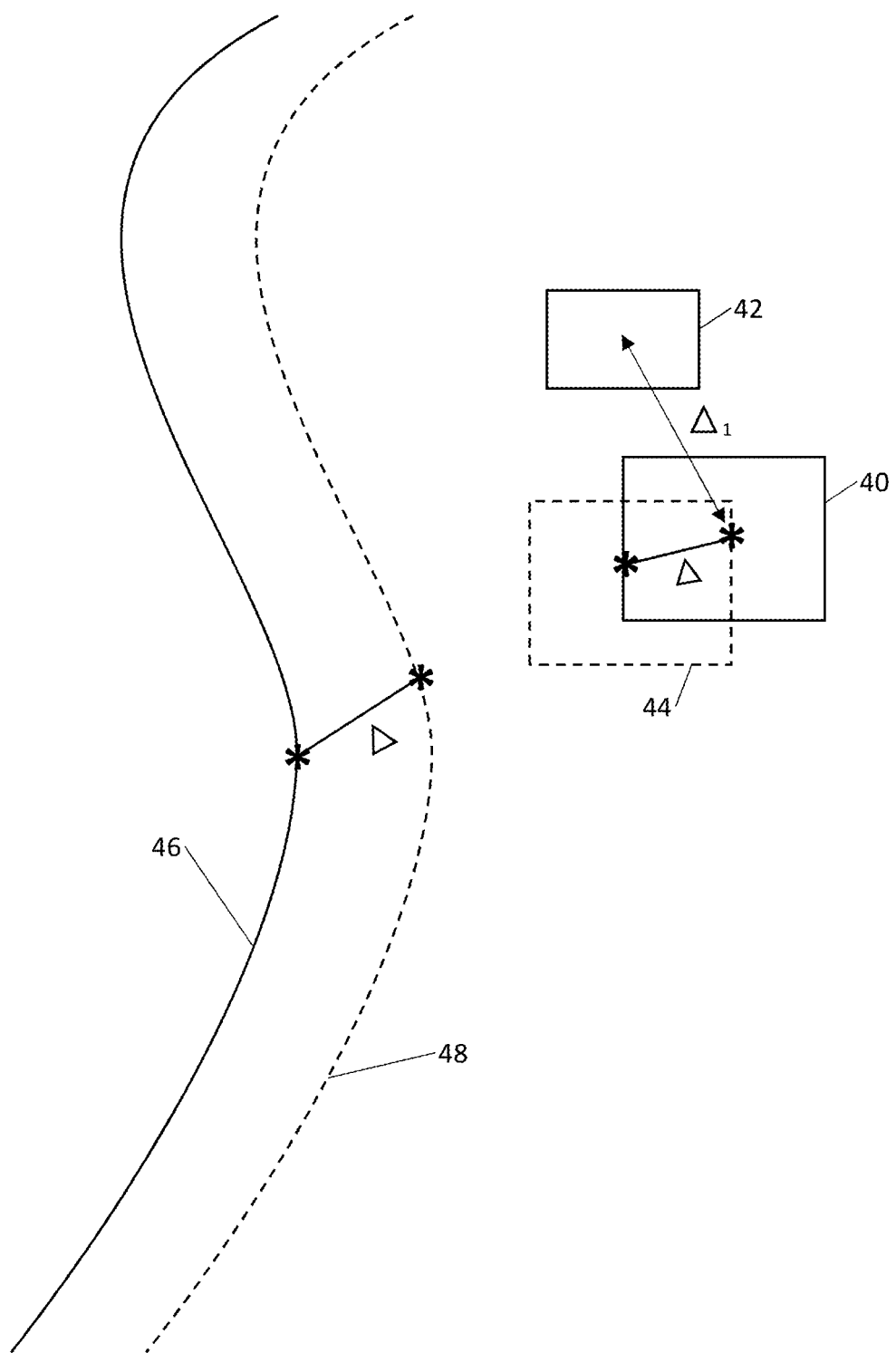
Figure 5:
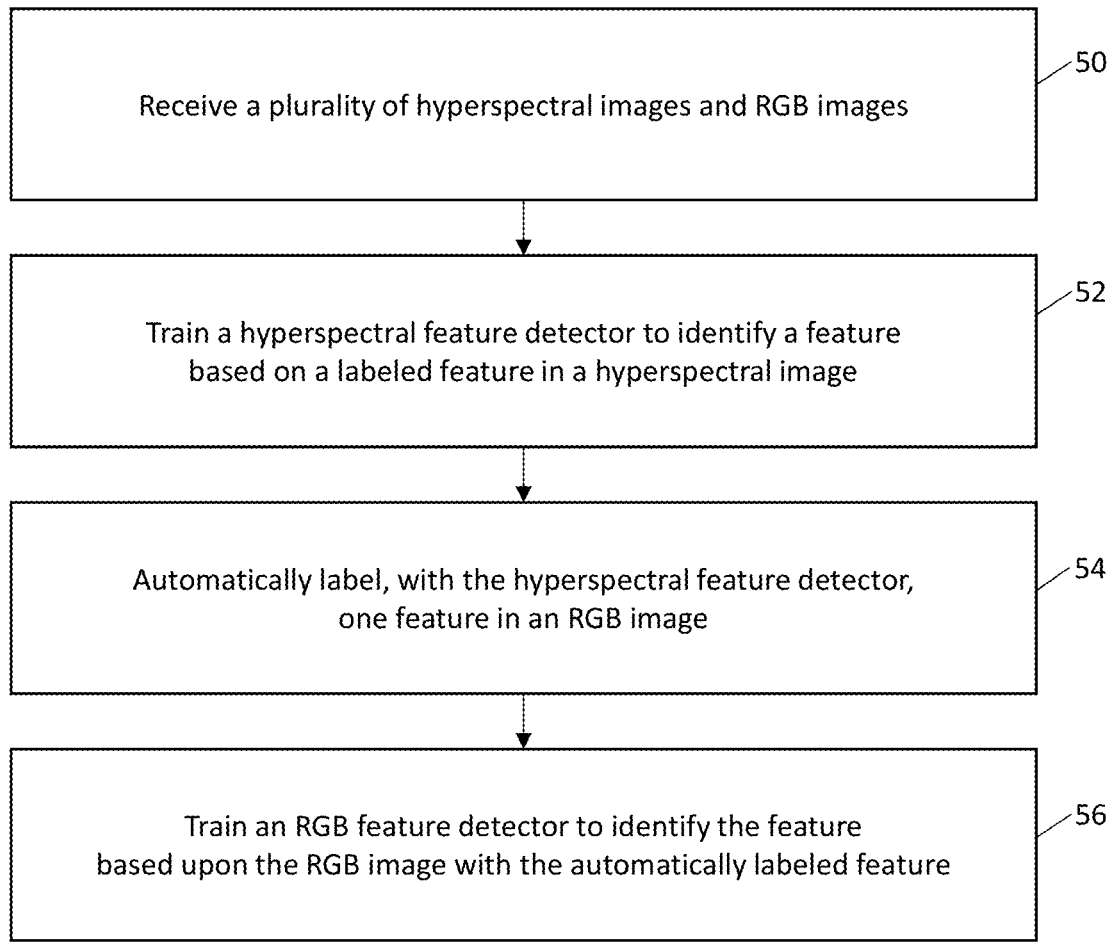
Figure 6:
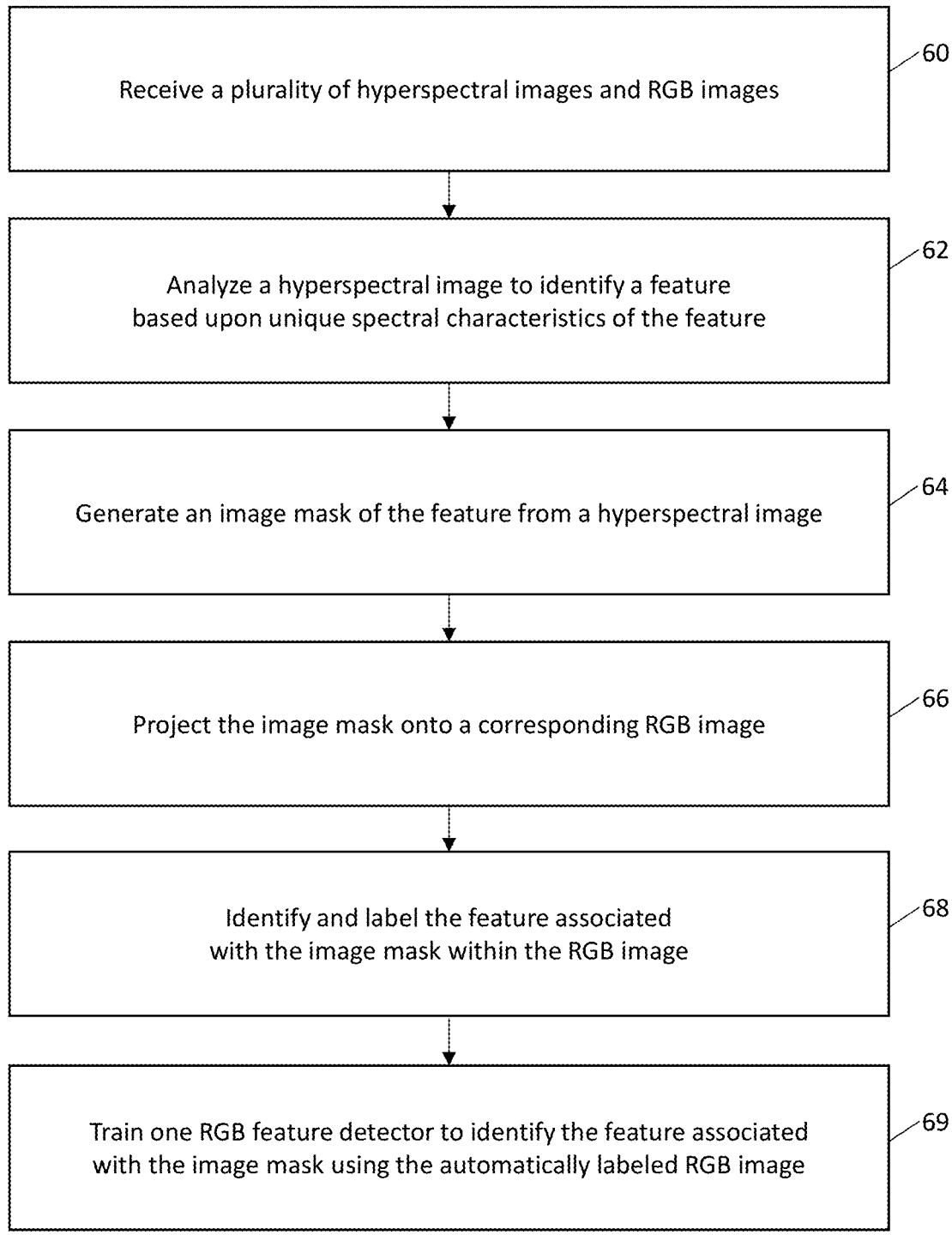
Figure 7:
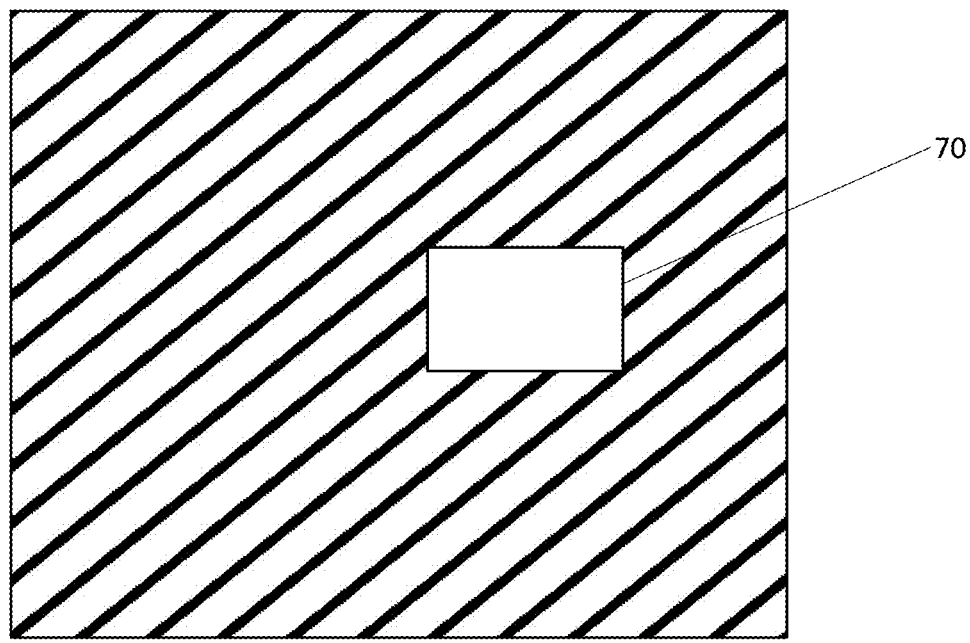

Having thus described certain example embodiments of the present invention in general terms, reference will hereinafter be made to the accompanying drawings which are not necessarily drawn to scale, and wherein:

FIG. 1 is a perspective view of a vehicle carrying at least one camera for capturing images of the environment;

FIG. 2 is a block diagram of a motion vision system including an apparatus specifically configured in accordance with an example embodiment of the present disclosure;

FIG. 3 is a flow chart illustrating operations performed, such as by the apparatus of FIG. 2, in accordance with an example embodiment of the present disclosure;

FIG. 4 illustrates the refinement of the representation of the path of travel of a vehicle based upon registration of a feature detected from an image with a corresponding feature from the map data accordance with an example embodiment of the present disclosure;

FIG. 5 is a flow chart illustrating operations performed, such as by the apparatus of FIG. 2, in accordance with another example embodiment of the present disclosure;

FIG. 6 is a flow chart illustrating operations performed, such as by the apparatus of FIG. 2, in accordance with a further example embodiment of the present disclosure; and FIG. 7 illustrates an image mask generated in accordance with an example embodiment of the present disclosure.

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

An apparatus, method and computer program product are provided in accordance with an example embodiment in order to efficiently train the feature detectors of a computer vision model to identify respective features from images captured by a camera. The computer vision model and the corresponding feature detectors may be utilized in a wide variety of different applications including automated vehicle technology, such as may be utilized in conjunction with autonomous vehicles and semi-autonomous vehicles. By way of example, FIG. 1 depicts an autonomous vehicle 10 that includes at least one camera, such as a red, green, blue (RGB) camera 12, for capturing RGB images of the environment about the vehicle. While the autonomous vehicle of FIG. 1 is depicted to have a single RGB camera for purposes of illustration, autonomous vehicle oftentimes include a plurality of RGB cameras and other sensors for detecting the environment thereabout.

A computer vision model analyses the images captured by the camera 12 onboard an autonomous vehicle 10 and identifies various features within the images. These features may include, for example, signs, lane markings or the like. Based upon the features identified within the image, the automated driving operations may be performed in a reliable manner. In conjunction with automated vehicle technology, a computer vision model must identify a plurality of different features. As such, the computer vision model includes a plurality of feature detectors, each of which is trained to identify a different respective feature. Moreover, each feature detector must be trained, typically based upon images in which features have been manually labelled, to identify a particular feature. Once trained, a feature detector may analyze images captured by the camera onboard the autonomous vehicle and reliably identify the respective feature within the images. However, the training of a feature detector generally requires substantial time and cost, both during the initial training of a feature detector and during the training of a feature detector that occurs in an instance in which the camera that captures the images changes. By utilizing bootstrapping techniques, the apparatus, method and computer program product of an example embodiment facilitate the training of a feature detector, thereby reducing the time and cost associated with the training while supporting reliable operation of the feature detector.

The apparatus 20 configured to train the feature detectors may be implemented in a variety of different computing devices including, for example, computer vision system 22 as shown in FIG. 2, such as utilized by an Advanced Driver Assistance System module (ADAS) which may at least partially control autonomous or semi-autonomous features of a vehicle, or as utilized by a vehicular navigation device or assisted driving device. In other embodiments, the apparatus may be embodied or partially embodied as a mobile terminal, such as a personal digital assistant (PDA), mobile telephone, smart phone, personal navigation device, smart watch, tablet computer, camera or the like.

Regardless of the type of computing device that embodies the apparatus 20, the apparatus of an example embodiment includes, is associated with or is otherwise in communication with a processor 24, a memory 26 and a communication interface 28. In some embodiments, the processor (and/or co-processors or any other processing circuitry assisting or otherwise associated with the processor) may be in communication with the memory device via a bus for passing information among components of the apparatus. The memory device may be non-transitory and may include, for example, one or more volatile and/or non-volatile memories. In other words, for example, the memory device may be an electronic storage device (for example, a computer readable storage medium) comprising gates configured to store data (for example, bits) that may be retrievable by a machine (for example, a computing device like the processor). The memory device may be configured to store information, data, content, applications, instructions, or the like for enabling the apparatus to carry out various functions in accordance with an example embodiment of the present invention. For example, the memory device could be configured to buffer input data for processing by the processor. Additionally or alternatively, the memory device could be configured to store instructions for execution by the processor.

The processor 24 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 24 may be configured to execute instructions stored in the memory device 26 or otherwise accessible to the processor. Alternatively or additionally, the processor may be configured to execute hard coded functionality. As such, whether configured by hardware or software methods, or by a combination thereof, the processor may represent an entity (for example, physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device (for example, the computing device) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor.

The apparatus 20 of an example embodiment may also optionally include a communication interface 28 that may be any means such as a device or circuitry embodied in either hardware or a combination of hardware and software that is configured to receive and/or transmit data from/to other electronic devices in communication with the apparatus, such as by NFC, described above. Additionally or alternatively, the communication interface may be configured to communicate via various cellular or other wireless protocols including Global System for Mobile Communications (GSM), such as but not limited to Long Term Evolution (LTE). In this regard, the communication interface may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s).

With reference now to FIG. 3, the operations performed, such as by the apparatus 20 of FIG. 2, in accordance with an example embodiment are depicted. As shown in block 30, the apparatus includes means, such as the processor 24, the communication interface 28, the memory device 26 or the like, for receiving images captured by a camera, such as an RGB camera 12, carried by a vehicle 10 while in transit. As shown in FIG. 2, the computer vision system 22 may include or otherwise be in communication with the camera carried by a vehicle, such as via the communication interface. In other embodiments, the images captured by the camera may have been stored, such as by the memory device or another image database accessible to the apparatus with the apparatus, such as the processor, thereafter configured to access the stored images. These images are generally captured by the camera while the vehicle drives along portions of a road network for which a map, such as a high-definition (HD) map of the type utilized for autonomous driving applications, exists. The images captured by the camera are manually labelled by humans to identify the features present in the images including the feature for which the feature detector is to be trained to identify.

Concurrent with the capture of images, the location of the vehicle 10 from which the image is captured as well as other optional vehicle telemetry data are collected. The location of the vehicle may be provided by various location techniques including the location provided by a Global Positioning System (GPS), a Global Navigation Satellite System (GNSS) or the like. Other examples of vehicle telemetry data include orientation, such as provided by an inertial measurement unit (IMU), the speed of the vehicle or the like. Based upon the location of the vehicle as well as the other optional vehicle telemetry data, the apparatus 20, such as the processor 24, is configured to determine the pose of the vehicle at the time at which the image was captured.

The apparatus 20 of this example embodiment includes means, such as the processor 24 or the like, for causing at least one feature from one or more of the images that have been labelled to be projected onto a map. See block 32. As described herein by way of example but not of limitation, the at least one feature may have been manually labelled. Alternatively, the at least one feature may have been labelled by a perception model, such as implemented by the apparatus, such as the processor, that has previously been trained to recognize some, but not all, features. As such, subsequent reference to a feature that has been manually labelled is provided by way of example but not of limitation, as the feature may alternatively have been labelled by a perception model that has previously been trained to recognize some, but not all, features.

The map may be an HD map configured to support autonomous driving, such as provided by the map database 14 of FIG. 2 that is included within or in communication with the computer vision system 22. HD maps may provide road geometry, lane geometry, road segment restrictions (e.g., speed limits), lane restrictions (e.g., turn-only lanes), and any other information that may be related to the road segments of a road network. Further, HD maps may be dynamic and may receive updates periodically from map services providers which may be informed by vehicles traveling along the road segments with sensor packages able to identify and update the HD maps. Further, properties of road segments may change at different times of day or different days of the week, such as express lanes which may be in a first direction of travel at a first time of day, and a second direction of travel at a second time of day. HD maps may include this information to provide accurate navigation and to facilitate autonomy along these road segments to supplement a sensor package associated with a vehicle.

As shown in FIG. 2, the map, such as the HD map, may be stored in a map database 14 that may include node data, road segment data or link data, point of interest (POI) data, traffic data or the like. The map database may also include cartographic data, routing data, and/or maneuvering data. According to some example embodiments, the road segment data records may be links or segments representing roads, streets, or paths, as may be used in calculating a route or recorded route information for determination of one or more personalized routes. The node data may be end points corresponding to the respective links or segments of road segment data. The road link data and the node data may represent a road network, such as used by vehicles, cars, trucks, buses, motorcycles, and/or other entities. Optionally, the map database may contain path segment and node data records or other data that may represent pedestrian paths or areas in addition to or instead of the vehicle road record data, for example. The road/link segments and nodes can be associated with attributes, such as geographic coordinates, street names, address ranges, speed limits, turn restrictions at intersections, and other navigation related attributes, as well as POIs, such as fueling stations, hotels, restaurants, museums, stadiums, offices, auto repair shops, buildings, stores, parks, etc. The map database can include data about the POIs and their respective locations in the POI records. The map database may include data about places, such as cities, towns, or other communities, and other geographic features such as bodies of water, mountain ranges, etc. Such place or feature data can be part of the POI data or can be associated with POIs or POI data records (such as a data point used for displaying or representing a position of a city). In addition, the map database can include event data (e.g., traffic incidents, construction activities, scheduled events, unscheduled events, etc.) associated with the POI data records or other records of the map database. Further, the map database may include information regarding various features of the road network including, for example, information regarding signs, lane markings or the like.

In one embodiment, the map database 14 may be maintained by a content provider e.g., the map data service provider, and may be accessed, for example, by the computer vision system 22. By way of example, the map data service provider can collect geographic data and dynamic data to generate and enhance the map database and dynamic data such as traffic-related data contained therein. There can be different ways used by the map developer to collect data. These ways can include obtaining data from other sources, such as municipalities or respective geographic authorities, such as via global information system databases. In addition, the map developer can employ field personnel to travel by vehicle along roads throughout the geographic region to observe features and/or record information about them, for example. Also, remote sensing, such as aerial or satellite photography and/or LiDAR, can be used to generate map geometries directly or through machine learning as described herein. However, the most ubiquitous form of data that may be available is vehicle data provided by vehicles, such as mobile devices, as they travel the roads throughout a region.

The map database 14 may be a master map database, such as an HD map database, stored in a format that facilitates updates, maintenance, and development. For example, the master map database or data in the master map database can be in an Oracle spatial format or other spatial format, such as for development or production purposes. The Oracle spatial format or development/production database can be compiled into a delivery format, such as a geographic data file (GDF) format. The data in the production and/or delivery formats can be compiled or further compiled to form geographic database products or databases, which can be used in end user navigation devices or systems.

For example, geographic data may be compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by a vehicle, for example. The navigation-related functions can correspond to vehicle navigation, pedestrian navigation, or other types of navigation. The compilation to produce the end user databases can be performed by a party or entity separate from the map developer. For example, a customer of the map developer, such as a navigation device developer or other end user device developer, can perform compilation on a received map database in a delivery format to produce one or more compiled navigation databases.

As mentioned above, the map data service provider map database 14 may be a master geographic database, but in alternate embodiments, a client side map database may represent a compiled navigation database that may be used in or with end user devices to provide navigation and/or map-related functions. In such a case, the map database can be downloaded or stored on the end user device including, for example, a computer vision system 22, which can access the map database through a wireless or wired connection.

In relation to the projection of the feature from the image that has been manually labelled, the feature may be projected onto the map based upon the location of the manually labelled feature. In this regard and as described above, the image may include an associated location at which the image was captured as well as other optional vehicle telemetry data, such as provided by metadata associated with the image. Based upon the location at which the image was captured as well as the other vehicle telemetry data and the position of the feature within the image, the apparatus 20, such as the processor 24, is configured to project the feature onto the map at the location of the feature that is provided by the image. With reference to FIG. 4, for example, an illustration of first and second features 40, 42, such as first and second signs, from the map stored by the map database 14 are depicted, along with a projection of the feature 44, such as a sign, from the image that has been manually labelled.

The apparatus 20 of the example embodiment also includes means, such as a processor 24 or the like, for refining the representation of the path of the vehicle 10 that carries the camera 12 that captured the one or more images based upon registration of the at least one feature that has been projected with the map. See block 34 of FIG. 3. In this regard, the apparatus, such as the processor, is configured to register (also known as to localize) the manually labelled feature from the image to a corresponding feature represented by the map. The corresponding feature represented by the map is a representation of the same feature, such as the same sign, the same lane marking or the like, by the map as the feature that has been manually labelled in the image. As a result of inaccuracies with respect to the identification of the location of the feature from the image that has been manually labelled, the projection of the feature onto the map may be offset from the corresponding feature represented by the map. As shown in FIG. 4, for example, a sign that has been manually labelled in an image may be projected onto the map as shown by dashed lines 44. The corresponding sign 40, however, is represented by the map at a location slightly offset from the location at which the sign is projected onto the map. The offset is identified as Δ in FIG. 4.

By registering the feature 44 that has been projected onto the map with the representation of the corresponding feature 40 from the map, such as by identifying the change in location Δ required to bring the location of the projected feature into alignment with the corresponding feature represented by the map, the apparatus 20, such as the processor 24, is configured to refine the pose of the vehicle 10, such as the representation of the path for the vehicle 10 that carries the camera 12, e.g., the portion of the path of the vehicle that includes the location at which the image from which the feature was projected was captured. In this regard, the path of the vehicle is initially defined as shown with a solid line 46 in FIG. 4 based upon information provided by the vehicle or sensors carried by or otherwise monitoring the path of the vehicle. For example, the path of the vehicle may be defined by the location of the vehicle and other vehicle telemetry data when each of a plurality of sequential images are captured by the camera, such as indicated by the designation X for the location of the vehicle at the time of capturing the image from which the feature 44 was projected. Additionally or alternatively, information regarding the path of the vehicle may be provided based upon a series of location readings, such as provided by a global positioning system (GPS) or other location sensor onboard the vehicle.

As described above, the apparatus 20, such as the processor 24, may be configured to register the feature 44 that has been projected onto the map with the representation of the corresponding feature 40 from the map in image space. Alternatively, the apparatus, such as the processor, may be configured to register the feature that has been projected onto the map with the representation of the corresponding feature from the map in other coordinates, such as world coordinates.

The apparatus 20, such as the processor 24, is configured to refine the pose of the vehicle 10, such as the representation of the path of the vehicle, by changing the designation of the location of the vehicle at the time at which the image was captured that included the feature that was manually labelled and that has been projected onto the map. In this regard, the apparatus, such as the processor, is configured to change the designation of the location of the vehicle at the time that the image with the projected feature was captured by an equal distance and in the same direction as the difference in distance and direction that the feature that has been projected onto the map must be translated in order to be registered with the corresponding feature from the map. As noted above, this difference is designated Δ in FIG. 4. The apparatus, such as the processor, is configured to repeat this refinement of the representation of the path of the vehicle at each of a plurality of instances, such as in conjunction with the location of the vehicle at the time of capturing each image that includes a manually labelled feature, with the refined representation of the path represented by a dashed line 48. As such, the representation of the path of travel of the vehicle may be refined based upon the registration of the manually labelled features with the corresponding features from the map.

Based upon the pose, e.g., the path 48, of the vehicle following refinement, the apparatus 20 includes means, such as the processor 24 or the like, for projecting one or more other features, that have not been identified to correspond to features from the images that have been previously, e.g., manually, labelled, from the map into the image plane, such as by overlaying the one or more features that are projected onto images captured by the camera 12 based upon the location at which the one or more images were captured as modified based upon refinement of the representation of the path of the vehicle. See block 36 of FIG. 3. The projection of the features may be represented in various manners including, for example, as points, lines, bounding boxes, polygons, segmentation masks, etc. The apparatus, such as the processor, may be configured to identify one or more other features represented by the map proximate the feature that corresponds to the manually labelled feature that has been projected onto the map. These other features represented by the map are sufficiently proximate the feature that corresponds to the manually labelled feature that has been projected onto the map, such as by being within a threshold distance of the feature corresponding to the manually labelled feature that has been projected onto the map, such that these other proximate features are likely to be within the same image from which the manually labelled feature was identified (but these other features have not been identified to correspond to a manually labelled feature from the image).

As shown in FIG. 4, for example, the map also includes feature 42 that has not been identified to correspond to a manually labelled feature from the image. However, feature 42 is proximate to feature 40 that has been identified to correspond to a manually labelled feature from the image and, as such, feature 42 may be in the same image as feature 40. Thus, the apparatus 20, such as the processor 24, is configured to project these one or more other features, that have not been identified to correspond to manually labelled features from the images, from the map into the respective image. With respect to the projection of these one or more features into the image, the relative location of these one or more features with respect to the feature that has been manually labelled and projected onto the map is identified based upon the refinement of the representation of the path of the vehicle. For example, a feature 42 in the map proximate to the feature 40 that corresponds to a manually labelled feature projected onto the map may be offset in the map from the feature 40 by a distance and in a direction denoted $\Delta_1$. As a result of the offset Δ of the manually labelled feature 44 projected onto the map relative to feature 40, however, the apparatus, such as the processor, is configured to determine the location of feature 42 upon projection into the image based upon a combination of the offset $\Delta_1$ of the features 40, 42 within the map as well as the offset Δ between the manually labelled feature 44 as projected into the map and the corresponding feature 42 in the map, such as by summing the two positional offsets $\Delta+\Delta_1$, that is, by summing the positional offset Δ between the manually labelled feature 44 projected onto the map and the corresponding feature 40 on the map as well as the offset $\Delta_1$ between the corresponding feature 40 from the map and the proximate feature 42 from the map.

Based upon the refinement in the position of the location of the proximate feature 42 from the map based upon the refinement of the pose of the vehicle 10, such as the representation of the path of the vehicle 10, the apparatus 20, such as the processor 24, more accurately projects the proximate feature 42 from the map into the image such that the feature in the image that corresponds to the proximate feature 42 can be automatically identified in a more accurate manner. Thus, these additional features, such as feature 42, that appear in both the map and in the images captured by the camera 12 that have not been manually labelled may be automatically labelled in accordance with an example embodiment to the present disclosure. Consequently, the apparatus includes means, such as the processor or the like, for training the feature detector, such as embodied by the processor, to identify a respective feature based upon the features that have been labelled, either manually in the case of feature 40 or in an automated manner in the case of proximate feature 42 as described above. See block 38 of FIG. 3.

In an example embodiment, the projection of a proximate feature 42 that does not correspond to a feature that has been manually labelled from the map into an image may overlap with a dynamic object within the image. For example, the image that has been captured may include one or more dynamic objects that move through the scene, but are not static. For example, dynamic objects may include other vehicles, people or other objects that are in in motion at the time at which the image is captured. In an instance in which the feature 42 that is to be projected from the map into an image overlaps or positionally corresponds with a dynamic object within the image, the apparatus 20, such as the processor 24, of an example embodiment is configured to exclude the projection of the feature from the map into the image.

As noted above, a computer vision model generally includes a plurality of feature detectors, each of which is trained to identify a different respective feature. As such, the apparatus 20, such as the processor 24, of an example embodiment is configured to train a plurality of feature detectors, each of which is trained to identify a different feature in accordance with the process described above.

As such, the feature detectors may be trained in efficient manner by bootstrapping the manual labelling of one or more features from the images so as to automatically label other, different features that were not manually labeled, from the same images. Thus, the feature detectors may be trained in an efficient manner with less cost and less time required for the training while still resulting in feature detectors that perform in a reliable manner. By providing for more efficient training of the feature detectors, the barriers to entry associated with the introduction of different cameras is lowered, thereby providing more flexibility in association with the use of cameras to capture the images.

In another example embodiment, images are captured, such as the images of the environment about an autonomous vehicle, not only by an RGB camera, but also by a hyperspectral camera. As shown in FIG. 1, for example, not only is an RGB camera 12 carried by the vehicle 10, but a hyperspectral camera 16 is also carried and is configured to capture images of the same field of view proximate the vehicle as the RGB camera, typically while the vehicle is n transit. In this example embodiment and as represented by block 50 of FIG. 5, the apparatus 20 includes means, such as the processor 24, the communication interface 28, the memory device 26 or the like, for receiving a plurality of hyperspectral images and a plurality of RGB images captured by a hyperspectral camera and an RGB camera, respectively. As shown in FIG. 2, the computer vision system 22 may include or otherwise be in communication with the cameras, including both a hyperspectral camera and an RGB camera, carried by a vehicle, such as via the communication interface. In other embodiments, the images captured by the cameras may have been stored, such as by the memory device or another image database accessible to the apparatus with the apparatus, such as the processor, thereafter configured to access the stored images. These images are generally captured by the cameras while the vehicle drives along portions of a road network for which a map, such as an HD map of the type utilized for autonomous driving applications, exists.

In an example embodiment, the apparatus 20 of this example embodiment also includes means, such as the processor 24 or the like, for training a hyperspectral feature detector embodied by the processor to identify at least one of a plurality of features based upon at least one feature in one or more hyperspectral images that has been labelled, such as by having been manually labeled. See block 52 of FIG. 5. Since a hyperspectral camera captures a richer representation of the visual field that an RGB camera, fewer hyperspectral images will be required to be manually labelled in order to train the hyperspectral feature detector in order to obtain a high quality hyperspectral feature detector than the larger number of RGB images that would need to be manually labelled in order to train a corresponding RGB feature detector in order to provide the same high quality feature detection. As such, the hyperspectral images that are manually labelled are generally a subset of the hyperspectral images that are captured since more hyperspectral images are captured than are required to be manually labelled in order to properly train the hyperspectral feature detector.

In this example embodiment, the apparatus 20 also includes means, such as the processor 24 or the like, for automatically labelling with the hyperspectral feature detector, such as may be embodied by the processor, the at least one feature that the hyperspectral feature detector has been trained to identify in an RGB image. See block 54 of FIG. 5. In other words, as opposed to manually labelling features in RGB images for subsequent use in training an RGB feature detector, the features within the RGB images are automatically labelled by a hyperspectral feature detector that has been trained to identify the respective features. In this regard, even though the hyperspectral feature detector has been trained utilizing manually labelled hyperspectral images, the hyperspectral feature detector can automatically identify the corresponding feature in an RGB image as the RGB image represents the same feature, albeit with few spectral components.

The apparatus 20 of this example embodiment also includes means, such as the processor 24 or the like, for then training an RGB feature detector to identify at least one feature based upon the RGB image in which the at least one feature has been automatically labelled by the hyperspectral feature detector. See block 56 of FIG. 5. Thus, the RGB images having the automatically labelled features are then utilized to train the RGB feature detectors, thereby avoiding the time and expense associated with manually labelling the features within the RGB images. While the features are manually labelled within the hyperspectral images or at least a subset of the hyperspectral images, the number of hyperspectral images that must be manually labelled is fewer than the number of RGB image that would need to be manually labelled in order to train the RGB feature detector to provide the same high quality feature detection. Thus, the RGB feature detector is efficiently trained by bootstrapping upon the feature detection offered by a hyperspectral feature detector.

In an example embodiment, the apparatus 20, such as the processor 24, is configured to train each of a plurality of hyperspectral feature detectors based upon manually labelled features from one or more hyperspectral images. Each hyperspectral feature detector is configured to identify a different respective feature. In this example embodiment, the apparatus, such as the processor, is also configured to train each of a plurality of RGB feature detectors based upon the images having features that have been automatically labelled by the hyperspectral feature detector. Each RGB feature detector is configured to identify a different respective feature. As such, the apparatus, method and computer program product of this example embodiment are also configured to efficiently train one or more RGB feature detectors for detecting one or more different features from RGB images by bootstrapping the feature detection offered by one or more hyperspectral feature detectors, thereby reducing the time and cost associated with training RGB feature detectors.

In yet another example embodiment that utilizes both hyperspectral images and RGB images, the apparatus includes means, such as the processor 24, the communication interface 28, the memory device 26 or the like, for receiving a plurality of hyperspectral images and a plurality of RGB images captured by a hyperspectral camera 16 and an RGB camera 12, respectively. See block 60 of FIG. 6. As shown in FIG. 2, the computer vision system 22 may include or otherwise be in communication with the cameras, including both a hyperspectral camera and an RGB camera, carried by a vehicle 10, such as via the communication interface. In other embodiments, the images captured by the cameras may have been stored, such as by the memory device or another image database accessible to the apparatus with the apparatus, such as the processor, thereafter configured to access the stored images. These images are generally captured by the cameras while the vehicle drives along portions of a road network for which a map, such as an HD map of the type utilized for autonomous driving applications, exists.

The apparatus 20 of this example embodiment also includes means, such as the processor 24 or the like, for generating an image mask of at least one feature from one or more hyperspectral images. See block 64 of FIG. 6. In this regard, certain features may have a distinctive absorption spectra in a hyperspectral image. For example, a green sign on a background of green terrain may be difficult to visually identify in an RGB image. However, the absorption spectra of the metal of the green sign and the vegetation of the green terrain are very different and may be clearly distinguished within a hyperspectral image. In this example embodiment, the spectral characteristics, such as the absorption spectra, of a respective feature may be predefined and stored, for example, by the memory device 26. These spectral characteristics may be unique for a respective feature and, as such, may be utilized in order to identify the respective feature in an automated manner from a hyperspectral image.

Thus, the apparatus 20, such as the processor 24, of this example embodiment is configured to analyze one or more hyperspectral images in order to identify a respective feature within the one or more hyperspectral images based upon the unique spectral characteristics associated with the respective feature. See block 62 of FIG. 6. For example, the apparatus, such as the processor, is configured to analyze the hyperspectral images in order to identify those regions within the hyperspectral images having the unique spectral characteristics associated with the respective feature. The resulting regions identified within the hyperspectral images that have the unique spectral characteristics associated with a respective feature are then utilized to generate an image mask. As shown in FIG. 7, the image mask 70 defines the region of the one or more hyperspectral images having the unique spectral characteristics associated with the respective feature. The mask has a size and shape that corresponds to the region having the unique spectral characteristics associated with the respective feature, such as a rectangular sign, such that the masked region is associated with the respective feature, but the region of the one or more hyperspectral images outside of the mask is not associated with the respective feature. Although FIG. 7 depicts a hyperspectral image having a single mask, the hyperspectral image may have two or more masks, associated with the same type of feature, or different types of features.

The apparatus 20 of this example embodiment includes means, such as the processor 24 or the like, for projecting the image mask 70 onto a corresponding RGB image. See block 66 of FIG. 6. In an example embodiment, the corresponding RGB image is captured at a common location, that is, the same location as the hyperspectral image for which the image mask is generated such that the RGB image and the hyperspectral image have the same field of view. In other embodiments, the corresponding RGB image may have been captured at a different location, but may include at least portions of the same field of view as the hyperspectral image.

By projecting the image masks 70 representative of respective features identified from the one or more hyperspectral images onto corresponding RGB images, the apparatus 20 of an example embodiment includes means, such as the processor 24 or the like, for identifying and correspondingly labelling the respective feature associated with the image mask within the RGB image. See block 68 of FIG. 6. Thus, the features that are uniquely identified within the hyperspectral image based upon the unique spectral characteristics of the respective features may be automatically labelled within the corresponding RGB images since the image masks are each associate with a respective feature.

The apparatus 20 of this example embodiment also includes means, such as the processor 24 or the like, for training an RGB feature detector to identify the at least one feature based upon the RGB image onto which the image mask 70 of the at least one feature has been projected. See block 69 of FIG. 6. Thus, the RGB images onto which the image mask has been projected and the feature associated with the image mask that has been correspondingly automatically labelled are utilized for training purposes in order to train an RGB feature detector to reliably detect the same respective feature.

The apparatus 20, such as the processor 24, of an example embodiment is configured to train each of a plurality of RBG feature detectors. Each RGB feature detector is configured to identify a different respective feature based upon the projection of a different image mask associated with a different feature onto a corresponding RGB image. Thus, the apparatus, such as the processor, of this example embodiment is configured to define image masks of the hyperspectral images and in association with a plurality of different features, each having a unique and different set of spectral characteristics. These image masks associated with different features may then be projected onto corresponding RGB images in order to automatically label the different features within the RBG images with the automatically labelled RGB images being utilized, in turn, to train different RGB feature detectors to reliably identify the different features. Thus, the apparatus, such as the processor of this example embodiment can train feature detectors without any manual labelling of features within the images with the only manual review being optionally provided for purposes of quality assurance. Thus, the apparatus, method and computer program product of this example embodiment are also configured to efficiently train RGB feature detectors in a manner that conserves the cost and time associated with the training, thereby reducing the barriers to entry associated with the use of different cameras to capture images of the environment.

FIGS. 3, 5 and 6 illustrate flowcharts depicting methods according to an example embodiment of the present invention. It will be understood that each block of the flowcharts and combination of blocks in the flowcharts may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory device 26 of an apparatus employing an embodiment of the present invention and executed by a processor 24 of the apparatus 20. As will be appreciated, any such computer program instructions may be loaded onto a computer or other programmable apparatus (for example, hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. An apparatus comprising at least one processor and at least one non-transitory memory including computer program code instructions, the computer program code instructions configured to, when executed, cause the apparatus to:
cause at least one feature from one or more images that have been labelled to be projected onto a map;
refine a representation of a path of a vehicle that carries a camera that captured the one or more images based upon registration of the at least one feature that has been projected onto the map;
based upon the representation of the path of the vehicle following refinement, project one or more other features that have not been labelled from the map into the one or more images to automatically generate a label of the one or more other features; and
train a feature detector to identify at least one of the one or more other features based upon the label automatically generated by the projection of the one or more other features from the map into the one or more other images.

2. An apparatus according to claim 1 wherein the computer program code instructions configured to, when executed, cause the apparatus to cause the at least one feature to be projected onto the map comprise computer program code instructions configured to, when executed, cause the apparatus to cause the at least one feature to be projected onto the map based upon a location at which the one or more images were captured.

3. An apparatus according to claim 1 wherein the computer program code instructions configured to, when executed, cause the apparatus to refine the representation of the path of the vehicle comprise computer program code instructions configured to, when executed, cause the apparatus to refine the representation of the path of the vehicle based upon the registration of the at least one feature from the one or more images that have been labeled to a corresponding feature represented by the map.

4. An apparatus according to claim 3 wherein the computer program code instructions configured to, when executed, cause the apparatus to refine the representation of the path of the vehicle comprise computer program code instructions configured to, when executed, cause the apparatus to modify a determined location of the vehicle upon capture of the one or more images based upon a difference between a location of the at least one feature as defined by the one or more images and a location of the corresponding feature represented by the map.

5. An apparatus according to claim 1 wherein the computer program code instructions configured to, when executed, cause the apparatus to project one or more other features comprise computer program code instructions configured to, when executed, cause the apparatus to project the one or more other features from the map into the one or more images based upon a location at which the one or more images were captured as modified based upon refinement of the representation of the path of the vehicle.

6. An apparatus according to claim 1 wherein the computer program code instructions configured to, when executed, cause the apparatus to project one or more other features comprise computer program code instructions configured to, when executed, cause the apparatus to exclude projection of a feature from the map into an image in an instance in which the projection of the feature overlaps with a dynamic object within the image.

7. An apparatus according to claim 1 wherein the computer program code instructions configured to, when executed, cause the apparatus to train the feature detector comprise computer program code instructions configured to, when executed, cause the apparatus to train each of a plurality of feature detectors, each feature detector configured to identify a different respective feature.

8. An apparatus according to claim 1 wherein the computer program code instructions are further configured to, when executed, cause the apparatus to receive images captured by a camera carried by a vehicle while in transit.

9. An apparatus according to claim 1 wherein the map comprises a map configured to support autonomous driving.

10. An apparatus comprising at least one processor and at least one non-transitory memory including computer program code instructions, the computer program code instructions configured to, when executed, cause the apparatus to:
train a hyperspectral feature detector to identify at least one of a plurality of features based upon the at least one feature in one or more hyperspectral images of a field of view, wherein the at least one feature has been labeled;
automatically label, with the hyperspectral feature detector, the at least one feature in a red green blue (RGB) image of at least a portion of the field of view; and
train an RGB feature detector to identify the at least one feature based upon the RGB image in which the at least one feature has been automatically labeled by the hyperspectral feature detector.

11. An apparatus according to claim 10 wherein the computer program code instructions are further configured to, when executed, cause the apparatus to receive a plurality of hyperspectral images and a plurality of RGB images captured by a hyperspectral camera and an RGB camera, respectively, wherein the hyperspectral camera and the RGB camera are each carried by a vehicle while in transit.

12. An apparatus according to claim 10 wherein the computer program code instructions configured to, when executed, cause the apparatus to train the hyperspectral feature detector comprise computer program code instructions configured to, when executed, cause the apparatus to train each of a plurality of hyperspectral feature detectors, each hyperspectral feature detector configured to identify a different respective feature.

13. An apparatus according to claim 12 wherein the computer program code instructions configured to, when executed, cause the apparatus to train the RGB feature detector comprise computer program code instructions configured to, when executed, cause the apparatus to train each of a plurality of RGB feature detectors, each RGB feature detector configured to identify a different respective feature based upon the RGB image in which the respective feature has been automatically labeled by different one of the plurality of hyperspectral feature detectors.

14. An apparatus according to claim 10 wherein the one or more hyperspectral images that are labeled are a subset of the hyperspectral images that are captured.

15. An apparatus comprising at least one processor and at least one non-transitory memory including computer program code instructions, the computer program code instructions configured to, when executed, cause the apparatus to:
generate an image mask of at least one feature from one or more hyperspectral images of a field of view;
project the image mask onto a corresponding red green blue (RGB) image of at least a portion of the field of view; and
train an RGB feature detector to identify the at least one feature based upon the RGB image onto which the image mask of the at least one feature has been projected.

16. An apparatus according to claim 15 wherein the computer program code instructions configured to, when executed, cause the apparatus to generate the image mask comprise computer program code instructions configured to, when executed, cause the apparatus to generate the image mask based on one or more unique spectral characteristics of the at least one feature.

17. An apparatus according to claim 15 wherein the computer program code instructions configured to, when executed, cause the apparatus to project the image mask onto the corresponding RGB image comprise computer program code instructions configured to, when executed, cause the apparatus to project the image mask onto the corresponding RGB image captured at a common location as the hyperspectral image from which the image mask is generated.

18. An apparatus according to claim 15 wherein the computer program code instructions configured to, when executed, cause the apparatus to project the image mask onto the corresponding RGB image comprise computer program code instructions configured to, when executed, cause the apparatus to label the at least one feature in the corresponding RGB image based upon projection of the image mask onto the corresponding RGB image.

19. An apparatus according to claim 15 wherein the computer program code instructions configured to, when executed, cause the apparatus to train the RGB feature detector comprise computer program code instructions configured to, when executed, cause the apparatus to train each of a plurality of RGB feature detectors, wherein each RGB feature detector is configured to identify a different respective feature based upon projection of a different image mask onto a corresponding RGB image, and wherein each image mask is generated for a different feature of a plurality of features.

20. An apparatus according to claim 15 wherein the computer program code instructions are further configured to, when executed, cause the apparatus to receive a plurality of hyperspectral images and a plurality of RGB images captured by a hyperspectral camera and an RGB camera, respectively, wherein the hyperspectral camera and the RGB camera are each carried by a vehicle while in transit.

* * * * *